May 21, 1963  E. PEEDU  3,090,632
CHUCK
Filed Dec. 23, 1960  3 Sheets-Sheet 1

INVENTOR
EINAR PEEDU
BY
Attorney

May 21, 1963   E. PEEDU   3,090,632
CHUCK
Filed Dec. 23, 1960   3 Sheets-Sheet 2
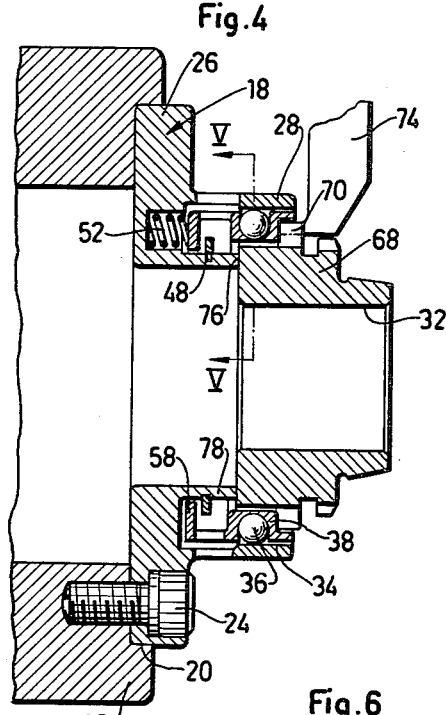
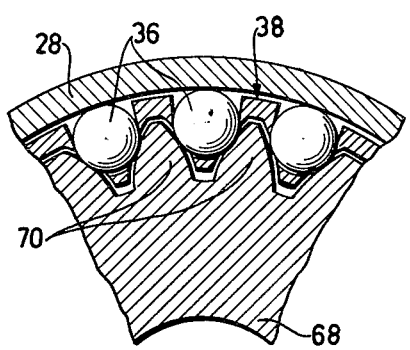
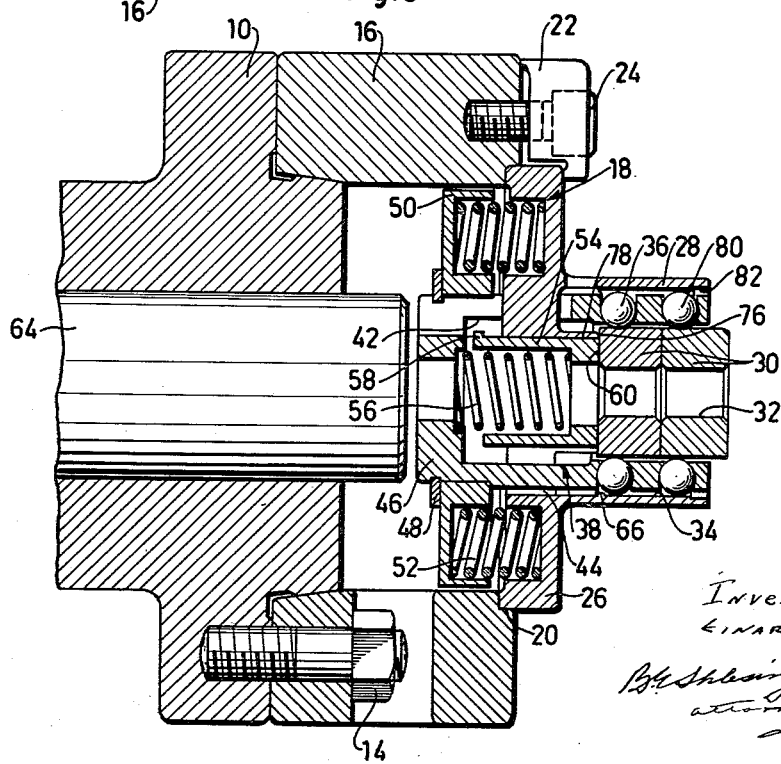
Inventor
Einar Peedu May 21, 1963  E. PEEDU  3,090,632
CHUCK Filed Dec. 23, 1960  3 Sheets-Sheet 3

Inventor
Einar Peedu
B.E. Schlesinger
Attorney

United States Patent Office 3,090,632
Patented May 21, 1963

3,090,632
CHUCK
Einar Peedu, Bromma, Sweden, assignor to Ulvsunda Verkstader Aktiebolag, Bromma, Sweden, a corporation of Sweden
Filed Dec. 23, 1960, Ser. No. 78,136
Claims priority, application Sweden Dec. 28, 1959
9 Claims. (Cl. 279—1)

This invention relates to a chuck for securing workpieces in a machine tool.

More particularly this invention relates to a chuck for securing workpieces in a cutting machine tool, especially a grinding machine.

One main object of the invention is to provide a chuck which enables a great centering accuracy to be obtained in combination with a large rigidity against deflection during the working operation.

According to one main feature of the invention the chuck is provided with a collet member and a row of rolling members which members are arranged to perform a rolling motion between the collet member and the workpiece and to produce an elastic deformation of the collet member in a radial direction as to cause said member to act as a guide for the workpiece. The rolling members are preferably constituted by balls and their rolling motion is suitably an axial one.

Further objects and advantages of the invention will become apparent from the following description considered in connection with the accompanying drawings which form part of this specification and of which:

FIG. 4 is a longitudinal sectional view of another embodiment of the invention intended for use in grinding the internal diameter of toothed rims.

FIG. 5 is a section along line V—V of FIG. 4 but represented on a larger scale.

FIGS. 6–8 are longitudinal sectional views of three further embodiments of the invention.

In the various figures identical or equivalent parts have been denoted by the same reference numerals.

Figure 1:
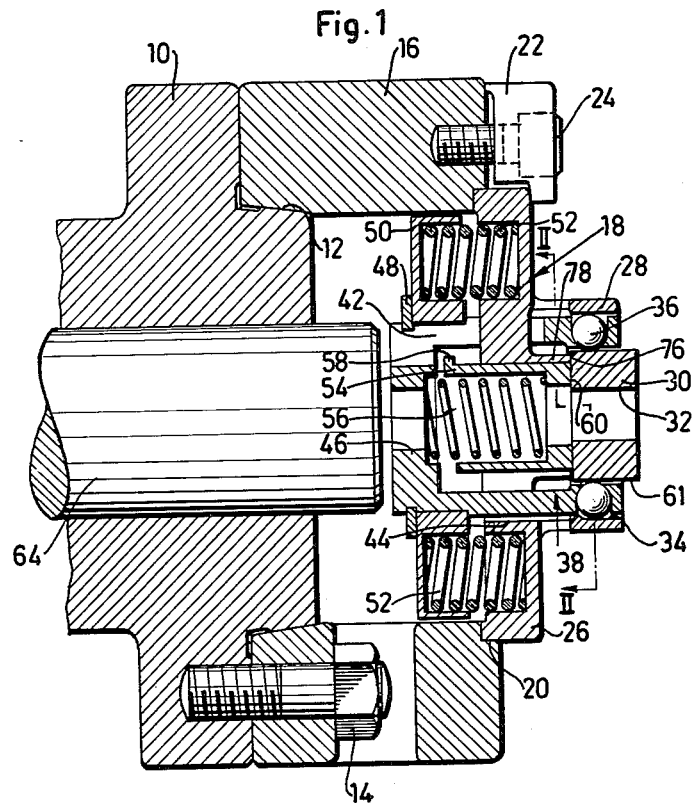
FIG. 1 is a longitudinal sectional view of a chuck constructed according to one embodiment of the invention.
Figure 2:
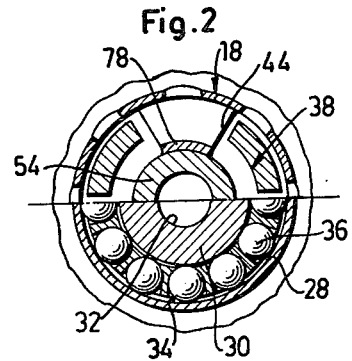
FIG. 2 is a section along line II—II in FIG. 1.
Figure 3:
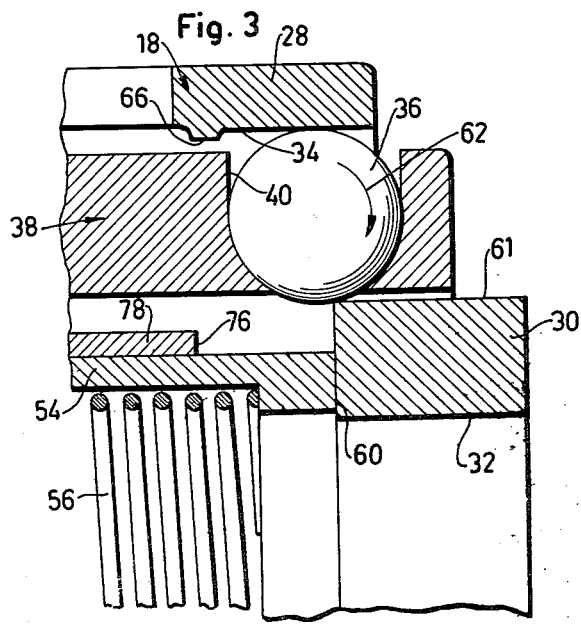
FIG. 3 is a partial view of the chuck and the workpiece represented in the same section as, but on a larger scale than that of FIG. 1.

In the embodiment shown in FIGS. 1–3, numeral 10 denotes a mandrel or spindle of a machine tool and more specifically a grinding machine, a ring element 16 being centered therein by means of tapering faces 12 and secured thereto by means of a bolt joint 14. A chuck ring devised according to the present invention and generally designated by 18 is in turn centered in a groove 20 formed in the ring element 16 and is retained to the latter by means of a plurality of circumferentially spaced clamping blocks 22 and bolts 24, the number of which in the embodiment shown is assumed to be three. The chuck ring 18 is provided with a substantially flange-shaped portion 26 extending radially towards the ring element 16 and a sleeve-shaped portion 28 which forms the collet proper for the workpiece. Said workpiece is in the embodiment in consideration assumed to be a metal ring 30 whose cylindrical inner surface 32 is to be ground to its final size. The collet 28 has an internal cylindrical raceway 34 for balls 36 which are maintained equally spaced around the periphery by means of a ball cage 38. This ball cage is provided with recesses 40 which, as may be best seen from FIG. 3, limit the movement radially inwards of the balls so as to prevent them from falling out of the chuck. In addition, the mutual axial position of the balls 36 and the ball cage 38 is determined by the recesses 40.

The ball cage 38 has arms 42 which extend axially through openings 44 in the chuck ring 18 and are interconnected on the inner side of said ring by an annular portion 46. A spring support 50 is secured to said annular portion by means of a lock washer 48, a number of helical springs 52 being interposed between the spring support and the flange portion 26 of the chuck ring, which springs tend to displace the ball cage 38 inwardly. A socket 54 is guided in the flange portion 26 and is axially movable in relationship thereto, the socket or sleeve being actuated by a spring 56 tending to force the socket outwardly towards the workpiece 30. In this operation the spring 56 bears against the annular portion 46 of the ball cage 38 and its range of movement outwardly is limited by a shoulder 58. The socket 54 has a plane end-surface 60 extending perpendicularly to the axis of the chuck and guiding the workpiece 30 when inserted into the chuck, as will be described in greater detail hereinafter.

FIG. 3 shows the workpiece 30 in an initial position when being secured in the chuck. It engages the plane surface 60 of the socket 54 and its centre line is thus parallel to that of the chuck. In the moment when the workpiece has come into contact with the balls 36, the spring 56 is slightly compressed. As soon as a pressure acting axially inwards is exerted on the workpiece 30, the balls 36 will roll up onto its external peripheral surface 61, and as the diameter of this surface is slightly larger than that of the circle circumscribed by the balls, an elastic deformation of the circumferentially closed collet sleeve 28 of chuck ring 18 is produced. The diameter of the surface 61 of the workpiece has been pre-machined to the dimension aimed at within a tolerance of e.g. a few hundredths of a millimetre. The difference between the diameter of said circumscribed circle and the diameter of the surface 61 is only of a slightly larger order, which results in that when the balls roll up onto the workpiece in the direction of the arrow 62 in FIG. 3, very large radial forces actuating the collet 28 are created. Said radial forces also cause an elastic deformation at the ball contact points on the collet 28 and the workpiece 30. The balls during their rolling movement to a final position which may be seen from FIG. 1 also roll on the peripheral inner surface 34 of the collet 28, and the ball cage 38 is forced to the left in FIGS. 1 and 3 due to the action of the springs 52. The spring 56 becomes slightly compressed since the axial movement of the workpiece 30 is greater than the axial movement of the centres of balls 36. The spring 56 is, however, considerably weaker than the springs 52.

When the workpiece 30 is first offered to the balls 36 as is illustrated in FIG. 3, an ejector member 64 (FIG. 1) is held to engagement with the ball cage 38 for balancing the pressure of the springs 52 acting inwards on the cage. The very offering operation may be performed manually with a very small power. As a result the ejector member is moved to the left which renders possible the rolling movement of the balls on the surfaces 61 and 34 under displacement in the inward direction. In its final position according to FIG. 1 the workpiece 30 has met end surfaces 76 formed on tongues 78 extending axially from the flange portion of the chuck ring 18, the number of which in the embodiment illustrated in FIGS. 1–3 is three. The end surfaces 76 lie in a plane accurately perpendicular to the centre line of the chuck due to which feature the location of the workpiece engaging these surfaces in relation to the centre line becomes exactly fixed. During the subsequent grinding operation the workpiece 30 will thus be accurately centered in the chuck by the chuck ring and the balls, the chuck ring additionally ensuring the centre line of the workpiece to be exactly parallel to that of the chuck.

Upon completion of the grinding operation the ejector member 64 is displaced axially against the ball cage 38 and causes the balls 36 to roll in a direction opposite to the previous direction while compressing the springs 52. When the balls approach the position illustrated in FIG. 3, the workpiece will be actuated by an axial force which ejects it from the chuck.

In the embodiment according to FIGS. 1–3, the collet 28 is provided with an annular protuberance or bead 66 which forms a stop to the rolling movement of the balls 36 on the peripheral surface 34 and thus limits the axial displacement of the ball cage 38 inwardly of the chuck in case the external diameter of the workpiece would fall below the range of a predetermined tolerance. In such a case the balls 36 will not be clamped against the cylindrical surface 34 but only against the bead 66, whereby the workpiece will still be secured in the chuck and damage of the machine is prevented.

The embodiment illustrated in FIGS. 4 and 5 differs from the preceding one primarily by the feature that it is intended for centering a workpiece 68 provided with an external rim of teeth 70. The balls 36 and the ball cage 38 are formed so that the teeth 70 fit in the gaps between the balls which latter therefore will engage and roll against the flanks of the teeth. In this case the workpiece 68 is offered to and retained in operating position by means of fingers 74 (or an integral disc), in which operation the workpiece will abut the end surface 76 of the portion 78 of the chuck ring 18 which portion in this embodiment is annular. The centering is effected in response to the mean error of the individual teeth, for example after the hardening operation, and will thus become more successful than in chucking devices for gear wheels used hitherto.

The embodiment shown in FIG. 6 is intended for a simultaneous chucking of several, such as two, workpieces 30 having the form of rings. The ball cage 38 carries two rows of balls 36, 80 each of which cooperates with one of the rings 30. The collet 28 of the chuck ring has a groove 82 of larger diameter wherein the balls 80 are received in the initial position so that the inner ring 30 may be offered to its balls 36 without interfering with the balls 80. Only after the outer one of rings 30 has been inserted and the two rings are pushed inwards, the balls 80 roll up onto the cylindrical surface 34 so that securing of the rings 30 may be performed in the way described above.

Figure 7:
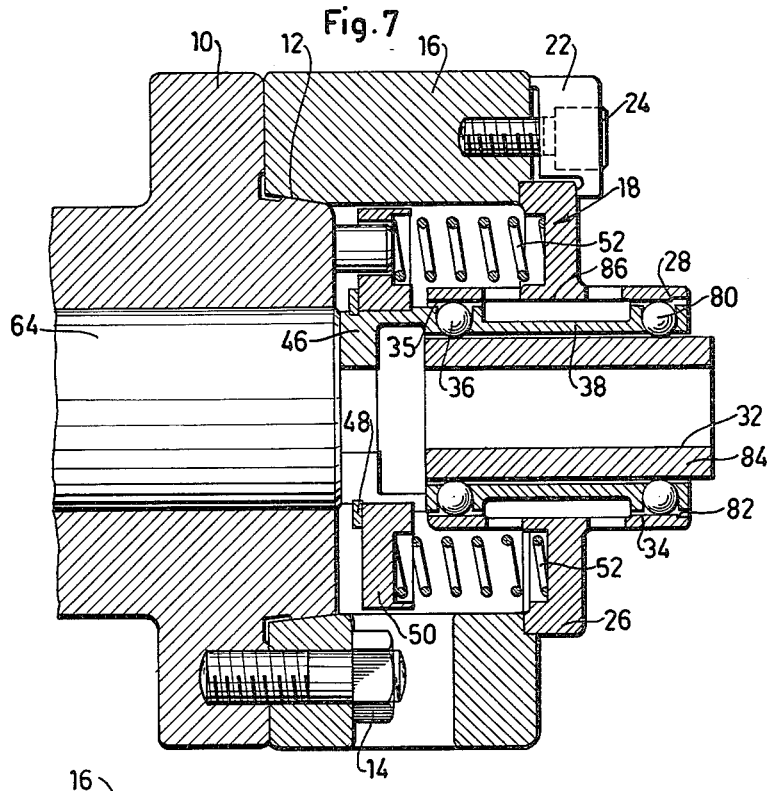

The embodiment shown in FIG. 7 is intended for internal grinding of a workpiece having the form of an elongated sleeve 84. The collet portion 28 of the chuck ring 18 is correspondingly elongated, and the flange 26 may therefore be positioned centrally on said portion. The collet 28 has internally besides a groove 82 also a central relieved portion 86 of larger diameter and exhibits two cylindrical surfaces 34 and 35 in order to allow the two rows of balls 36, 80 to roll up onto their respective surface 35, 34 with the predetermined mutual spacing, while elastically deforming the collet 28. In this embodiment the two rows of balls 36, 80 both center and align the workpiece which ensures the centre lines of the external surface of the workpiece and the chuck to coincide. The inserting movement of the workpiece 84 is limited in this embodiment by the ball cage 38 with its inner portion 46 engaging the ejector member 64.

Figure 8:
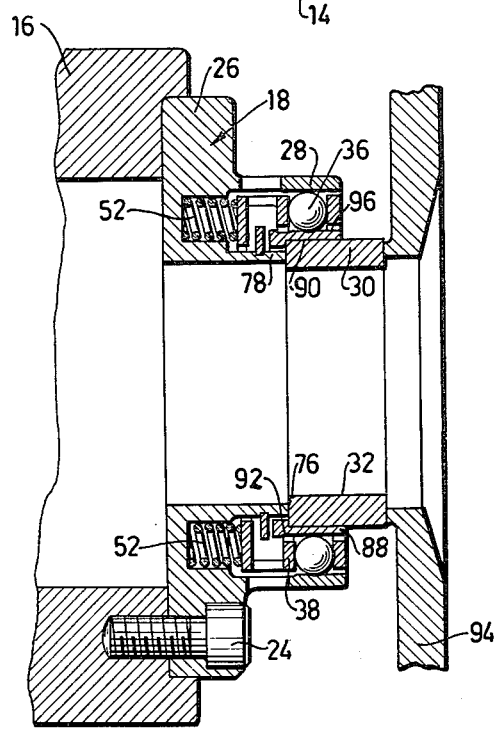

FIG. 8 shows an embodiment in which the balls 36 actuate the workpiece 30 by the intermediary of an annulus 88. This annulus is provided with a shoulder 90 and has a slightly larger inner diameter than the outer diameter of the workpiece so that the latter may be inserted into the annulus. In the initial position the balls 36 are located in an annular groove 92 formed in the outer face of the annulus. When the workpiece 30 is moved to the left by means of a disc 94, the balls 36 will roll up out of the groove and onto the external cylindrical surface 96 of the annulus to the position shown in the figure. An elastic deformation of the annulus as well as of the collet 28 is produced to that the workpiece is secured in the chuck.

The basic idea of the invention is also applicable to the inverse case where the workpiece has an external surface to be worked in the machine. The collet member 18 is then provided instead with an external cylindrical surface 34 and the workpiece is mounted concentrically about this surface. The balls located between the collet member and the workpiece roll up onto the external rolling surface during the axial securing movement of the workpiece. Under these inverse conditions the workpiece is subjected to a tensile force and the collet to an inwardly acting pressure. In other respects the various embodiments may be used in this alternative, for instance when working simultaneously a plurality of workpieces. In some cases the balls 36 may be replaced by rolling members of another shape, such as spherical rollers, for example.

While several more or less specific embodiments of the invention have been shown and described, it is to be understood that this is for purpose of illustration only, and that the invention is not limited thereby, but its scope should be determined by the appended claims.

What I claim is:

1. A chuck for holding a workpiece comprising an annular collet member having an internal cylindrical surface, a central opening into which a workpiece may be inserted axially of said opening, a ball cage mounted in said opening coaxially thereof, a plurality of balls mounted in said cage around said opening to engage and roll on said cylindrical surface axially thereof as the workpiece enters said opening, said balls being normally positioned in said cage so that the distance between diametrally opposed balls is less than the outside diameter of the workpiece at the end thereof which is inserted in said chuck, whereby upon insertion of the workpiece in the chuck, said balls will roll on said cylindrical surface axially thereof thereby to produce an elastic deformation of said collet member in a radial direction to cause the balls to exert a radial inwardly directed gripping force on the workpiece, and stop means for limiting the distance which the workpiece can be inserted into said opening.

2. A chuck for holding a workpiece as claimed in claim 1, wherein springs are interposed between said collet member and said cage constantly urging said cage inwardly axially of said opening.

3. A chuck for holding a workpiece as claimed in claim 2, wherein an ejector member is mounted behind the cage in axial alignment therewith, and to be movable axially forwardly to move the cage outwardly against the resistance of said springs to release a workpiece from the chuck.

4. A chuck for holding a workpiece as claimed in claim 1 wherein said balls are also disposed in said cage to roll on the outside peripheral surface of the workpiece as the workpiece is inserted into said opening.

5. A chuck for holding a workpiece as claimed in claim 1 wherein an annulus is mounted in said collet to surround said opening and to receive the workpiece, and said balls are interposed between said annulus and said cylindrical surface to roll on said cylindrical surface and on the outside peripheral surface of said annulus axially thereof during insertion of the workpiece axially in said opening.

6. A chuck for holding a workpiece as claimed in claim 1, wherein there are a plurality of sets of said balls, said sets are mounted in said cage, each set comprising a plurality of balls disposed around said opening, and the several sets of balls are displaced from one another axially of said opening, and each set is positioned to engage and roll on said cylindrical surface.

7. A chuck for holding a workpiece as claimed in claim 1, wherein for the purpose of chucking a plurality of workpieces simultaneously in axially aligned relation, there are a plurality of sets of said balls mounted in said cage, each set comprising a plurality of balls disposed around said opening, the several sets of balls are displaced from one another axially of said opening, and there is a surface adjoining said cylindrical surface at the axially outer end thereof in which the axially outermost set of said balls is normally positioned and which is of greater diameter than said cylindrical surface and from which they roll onto said cylindrical surface when the axially outermost of the workpieces is inserted into said opening.

8. A chuck for holding a workpiece as claimed in claim 1, wherein said collet member has a front plane face which is perpendicular to the axis of said opening and against which the workpiece seats when chucked.

9. A chuck for holding a workpiece comprising an annular collet member having a cylindrical surface, a ball cage mounted coaxially of said surface, a plurality of balls mounted in said cage and disposed around the axis of said surface, and disposed to be engaged by a surface of the workpiece when the workpiece is mounted on the chuck, said balls being normally positioned in said cage so that the distance between diametrally opposed balls is different from the diameter of the latter surface in such way that upon insertion of the workpiece into the chuck the balls will engage both said surfaces and roll axially on said cylindrical surface and produce an elastic deformation of said collet member in a radial direction causing the balls to exert a radially-directed gripping force on the workpiece, and stop means for limiting the chucking movement of the workpiece axially of said cylindrical surface.

References Cited in the file of this patent

UNITED STATES PATENTS 2,475,861    Thalmann _____ July 12, 1949

FOREIGN PATENTS 651,556    Great Britain _____ Apr. 4, 1951